Patented Dec. 29, 1942

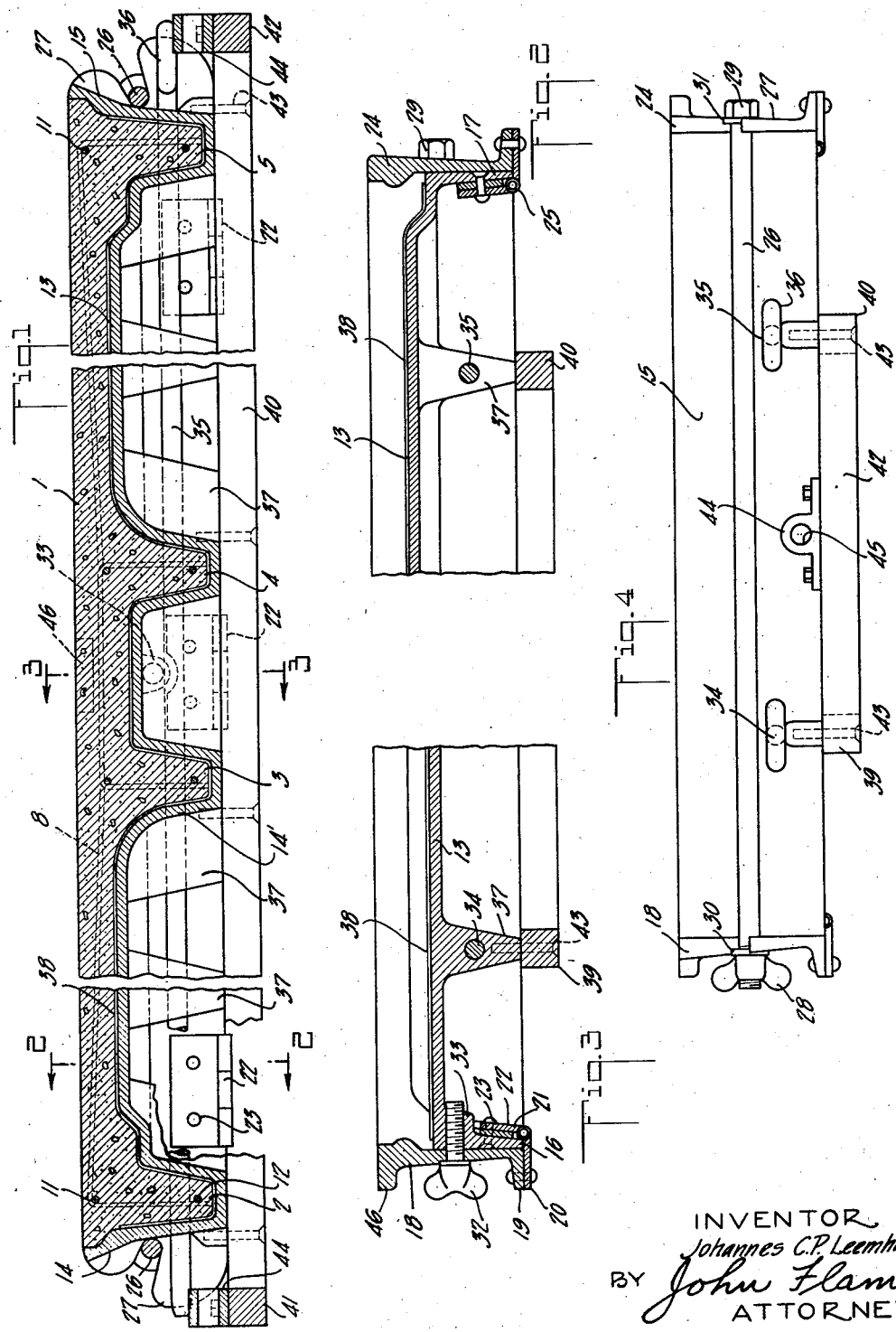

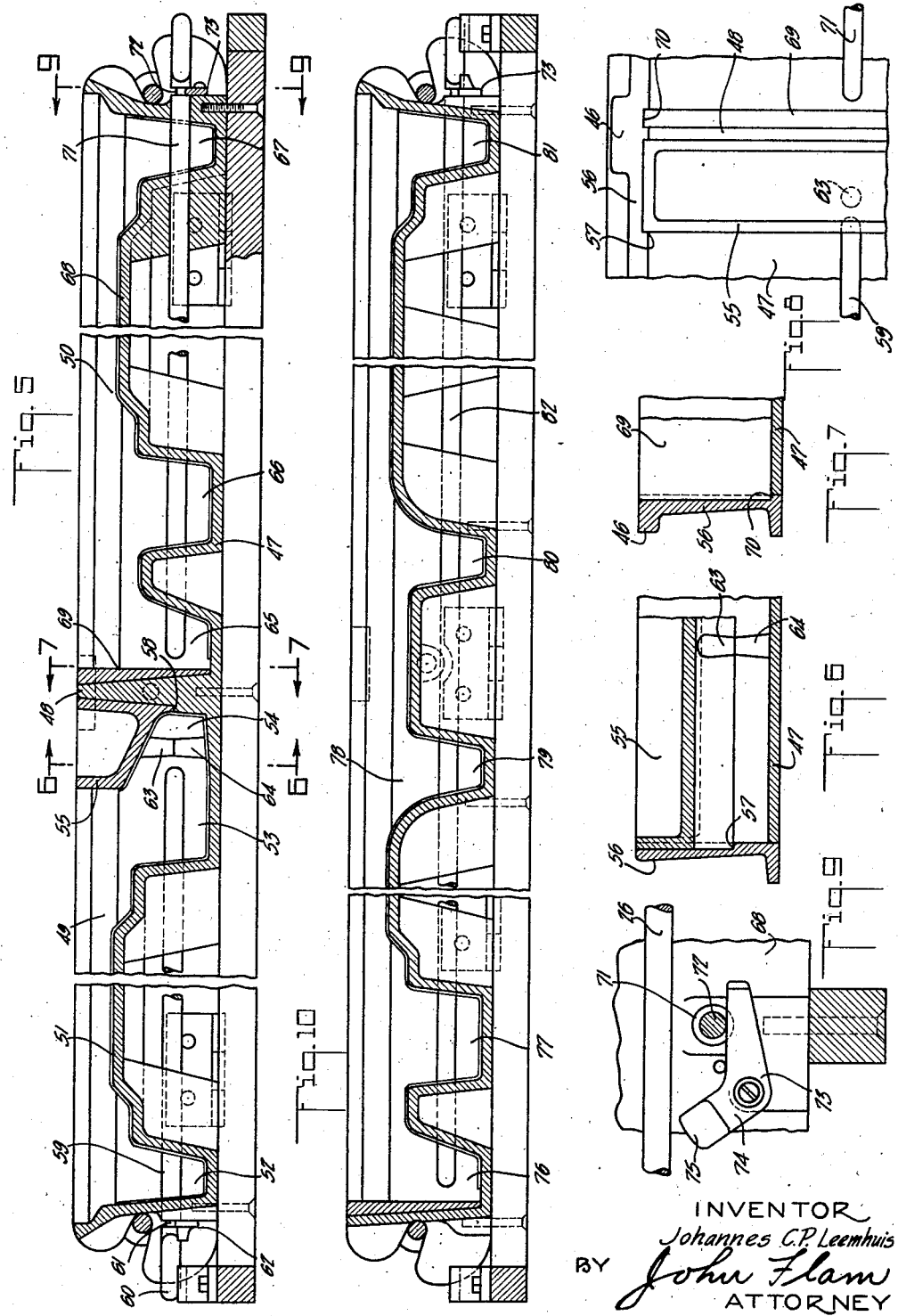

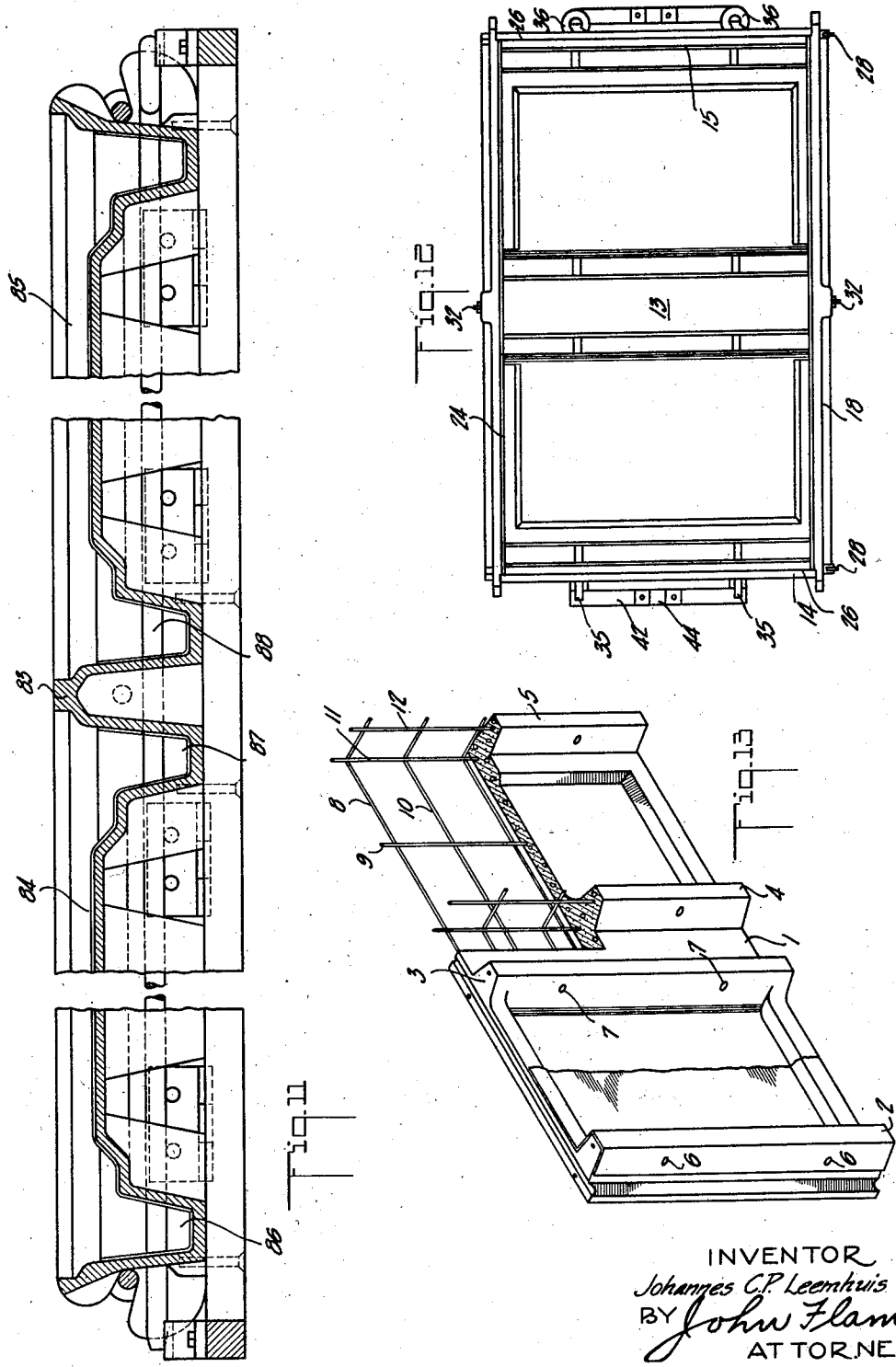

2,306,548

UNITED STATES PATENT OFFICE 2,306,548

APPARATUS FOR MOLDING

Johannes C. P. Leemhuis, Los Angeles, Calif., assignor, by mesne assignments, to Edward James Donaldson, Johannesburg, Transvaal, Union of South Africa Original application August 26, 1938, Serial No. 226,920. Divided and this application November 20, 1939, Serial No. 305,275

3 Claims. (Cl. 25—121)

This invention relates to the molding of material; and particularly concrete plates or slabs. Such plates are described and claimed in a prior application, filed on May 31, 1939, under Serial Number 210,921, in the name of Johannes C. P. Leemhuis and entitled: "Building materials and methods." This application is a division of an application filed August 26, 1938, Serial Number 226,920, in the name of Johannes C. P. Leemhuis, and entitled "Method for molding."

In the prior application, Serial No. 210,921, a system of joining the plates by the aid of pins passing through overlapped pillar sections formed integrally with the plates. The present invention is particularly adapted to provide a mold in which the apertures for the pins may be accurately formed as by the aid of metal core pins.

It is accordingly one of the objects of this invention to provide molds of this general character that are inexpensive to construct and yet are thoroughly reliable in operation.

In the process of molding, it is common to place the mold on a vibrating table while it is being filled, so as to cause the concrete mixture to fill accurately all of the mold spaces and to produce in general, a better molded article. Thereafter, it has been customary to place the filled mold in a place where the article may acquire sufficient rigidity to permit stripping it from the mold. The quicker the stripping may occur, the less the number of molds need be for the same production. It is another object of this invention to make it possible to strip the articles from the molds promptly upon completion of the molding operation.

This result is obtained by lining the mold surface with paper, such as multi-ply builder's paper. This paper serves not only to support the newly molded plates so as to reduce slumping, but also prevents adhesion of the plate in the mold. Accordingly it is another object of this invention to utilize paper or the like as a mold lining.

The paper is preferably caused to adhere permanently to the plates, to form, as explained in the prior application, an insulation layer that is also impervious to moisture. The plates, with the adhering paper layer, are so placed that they form the inner and outer portions of a building wall, the paper forming a layer substantially entirely interrupting contact between the inner and outer sets of plates. It is another object of this invention to make it possible to provide such an adherent insulation layer in an expeditious and inexpensive manner.

This invention possesses many other advantages, and has other objects which may be made more easily apparent from a consideration of several embodiments of the invention. For this purpose there are shown a few forms in the drawings accompanying and forming part of the present specification. These forms, which illustrate the general principles of my invention, will now be described in detail; but it is to be understood that this detailed description is not to be taken in a limiting sense, since the scope of my invention is best defined by the appended claims.

Referring to the drawings:

Fig. 1 is a sectional view of a mold structure incorporating the invention, the structure being shown as having been filled with plastic material to form the cast article;

Fig. 2 is a fragmentary sectional view, taken along plane 2—2 of Fig. 1;

Fig. 3 is a fragmentary sectional view, taken along the plane 3—3 of Fig. 1;

Fig. 4 is a side elevation of the mold structure illustrated in Fig. 1;

Fig. 5 is a view similar to Fig. 1, but showing the mold structure adapted for casting a slightly different form of concrete plate or slab;

Figs. 6 and 7 are respectively, fragmentary sectional views taken along planes 6—6 and 7—7 of Fig. 5, with the paper lining of the mold omitted;

Fig. 8 is a fragmentary top plan view of the mold shown in Fig. 5, with the paper lining omitted;

Fig. 9 is a fragmentary sectional view taken along plane 9—9 of Fig. 5;

Figs. 10 and 11 are views similar to Fig. 5, showing mold structures for casting other forms of plates;

Fig. 12 is a top plan view of the mold illustrated in Fig. 1; and

Fig. 13 is a pictorial view, partly broken away, illustrating the plate that is cast by the aid of the mold structure illustrated in Fig. 1.

The cast article 1, in the form of a reinforced concrete plate structure, is shown more particularly in Fig. 13. It is formed with a series of spaced pillar sections 2, 3, 4 and 5. These pillar sections, as explained in the prior aplication hereinabove referred to, are arranged to overlap pillar sections of similar plates and to be anchored together by pins passing through apertures 6 and 7, transverse to these sections. Furthermore, if desired, the plate structure 1 may be reinforced as by crossed wires or rods 8, 9, 10, 11 and 12.

In order to form a mold for this article, use is made of a metal mold bottom member 13. This mold bottom member may be made conveniently from thin aluminum or the like. It is provided with appropriate downwardly extending recesses such as 14', for defining mold spaces for the pillar sections 2, 3, 4 and 5. The bottom surface of the mold bottom 13 conforms to these recesses.

As seen most clearly in Fig. 1, this bottom mold plate 13 is provided with integrally formed sides 14 and 15 defining the end surfaces of the recesses defining the pillar sections 2 and 5 respectively. The other sides required to complete the mold space, are shown as hinged to the depending edge flanges 16 and 17 of the bottom member 13 (Figs. 2 and 3). Thus the hinged side 18 is shown as having a bottom rib 19 fastened to one element 20 of a hinge structure 21. The other element 22 of the hinge structure is appropriately fastened, as by rivets 23, to the flange 16. As shown more clearly in Fig. 1, there may be several hinges spaced along the bottom edge of each side member.

Similarly the opposite side member 24 is hinged by a plurality of hinge structures 25 to the depending flange 17 of the bottom plate 13. Accordingly it is possible to open the mold structure by swinging the side member 18 is a counter-clockwise direction as in Fig. 3; and by swinging side member 24 in a clockwise direction as viewed in Fig. 2.

Fastening means are provided for holding the side members 18 and 24 in the closed position illustrated. For this purpose use is made of a pair of through bolts 26 extending between the wings 27 formed integrally with the side walls 14 and 15 of the bottom plate 13. Each of the bolts 26 is provided with a nut such as the wing nut 28 (Fig. 4). This wing nut as well as the head 29 of each bolt 26 may be provided with collars or washers 30 and 31 engaged in recesses appropriately formed in the sides 18 and 24.

In order to supplement the detachable fastening means 26 there are provided wing screws 32 (Fig. 3) placed in an intermediate position along each side wall 18 and 24 and passing through an appropriate aperture therein. These screws engage the threaded apertures in bosses 33 integral with the bottom mold plate 13.

In order to form the apertures 6, 7, etc. for the passage of the anchoring pins as described in the prior application, use is made of a pair of core rods 34 and 35. These rods 34 and 35 may each be provided with a handle 36, shown to best advantage in Fig. 12. They pass through each of the recesses for forming the pillar sections 2, 3, 4 and 5 and underneath the bottom plate 13. In order to form a sufficiently long guide for these core rods 34 and 35, lugs 37 are shown as depending below, and formed integral with, the bottom mold plate 13, through which these rods 34 and 35 extend.

In the use of the mold as described in connection with the earlier filed application, the mold space is first lined with insulation material such as builder's paper 38. This may be two or three ply paper, adhered together as by tar or an asphaltic or other waterproof composition. This paper 38 substantially entirely covers the bottom of the mold and also projects along the sides 14 and 15. This paper lining is first placed within the mold prior to the insertion of the core rods 34 and 35.

In order to provide a frame support by the aid of which the entire mold structure may be conveniently transported or otherwise handled, the entire mold rests upon and is fastened to a rectangular frame having the sides 39, 40 (Figs. 3 and 4) and the ends 41 and 42 (Figs. 1 and 2). The lugs 37 may be extended so as to provide a flat surface resting upon the sides 39 and 40, as illustrated more clearly in Figs. 2 and 3. Fastening screws such as 43 may be utilized for attaching the frame 39, 40, 41 and 42 to the bottom of these lugs, and to the mold structure.

This frame extends somewhat beyond the sides of the mold, as illustrated in Fig. 1. There may also be provided standards 44 on the opposite ends 41 and 42. These standards provide a journal bearing 45 (Fig. 4) for the accommodation of pivot pins for facilitating both the transportation and the reversal of the mold in order to strip it from the cast article.

In using the mold structure the sides 18 and 24 are first attached by the aid of the bolts 26 and the screws 32, to the mold bottom 13. Then the paper 38 is disposed over the interior mold surface. If desired, the reinforcing members 8, 9, 10, 11 and 12, which are fastened together to form a grid-like structure, may be placed inside of the mold. The core rods 34 and 35 may then be inserted. These rods, passing immediately above the reinforcing bars 12, as shown in Fig. 1, ensure against material displacement of the reinforcement during the casting process. The mold structure may now be disposed on a vibrating table in position for the concrete mixture to be poured into it to form the article 1. In order to hold the assembled mold structure firmly to the table, use may be made of a pair of oppositely directed lugs 46 for accommodating a clamping device.

Soon after this molding operation is completed, the mold may be inverted for stripping it from the article 1. The paper 38 adheres to the plate 1 because the newly molded plate is quite moist. There is, however, no material adhesion between the paper 38 and the mold surfaces so that no difficulty is experienced in this stripping act. Were it not for the paper, the suction between the mold surface and the newly made concrete surface would be so great as to distort the freshly made concrete. By the aid of the intervening paper layer 38 this difficulty is entirely obviated. The paper also prevents the newly cast article from slumping.

The upper surface of the article 1 as illustrated in Fig. 1 is intended to form the exposed wall surface. For that purpose it may be smoothed off before the article is removed from the mold. If desired, provision may be made to imbed sand within the exposed surface of the plates, as by placing sand immediately upon completion of the molding operation, upon the top surface of the plate 1. This serves to prevent the concrete mixture from which the plate 1 is formed from adhering to the pallet upon which the molded article rests, although in most instances no material difficulty in this respect is experienced. It also gives a pleasing finish to the exterior of the wall. Of course, other types of finishes as is well understood, might be used.

After the mold structure is reversed and the article 1 stripped therefrom upon the pallet, the pallet with the article loaded thereon may be placed into a curing chamber or kiln such as a steam chamber. The steaming process in a suitable kiln serves to produce a strong adhesion of the paper 38 to the molded article 1. This strong adhesion is probably due to the partial dissolution of the glucose matter; such glucose matter being incorporated within the paper during its manufacture. This glucose contacts the plastic material of the plate and serves as a bond between the plate and the paper.

In forming a complete building structure, plates 1 are utilized as a standard plate for forming flat wall surfaces. Other forms of the plates, however, are required to form interlocking corner members, all as fully described in the above identified earlier filed application Serial No. 210,921.

In the mold structure illustrated in Figs. 5, 6, 7, 8 and 9, the mold structures are used for casting a pair of plate sections which are intended to inter-fit at right angles to form a corner.

For this purpose the mold bottom plate 47 is shown as having an intermediate integral partition 48. This partition plate divides the mold structure into two mold spaces 49 and 50. The bottom of the mold space 49 is formed by the bottom mold plate 51 of similar contour to the bottom member 13 of Fig. 1. It forms a recess 52 to define an edge pillar section. The recess 53 at the right hand end forms a rather wide space for a pillar section, and ending in a recess 54 for defining a projection. This projection is adapted to interfit in a corresponding recess formed in another plate to provide a rectangular corner structure.

In order to provide a mold wall for the top surface of the recess 54, use is made of a removable overhanging mold member 55. This may be in the form of a hollow metallic trough-like structure shown in Fig. 8 as extending across the mold plate and supported on the hinged mold sides 56, as by the aid of a shoulder 57 (Figs. 6 and 8) provided in the inner faces of the sides 56. A limiting shoulder 58 (Fig. 5) is also provided on the central partition 48 to form a rest for the bottom edge of the structure 55. This member 55 is readily assembled and removed with respect to the mold. The supporting shoulders formed on the sides 56 and the central partition 48 ensure accurate positioning of this member. The space 54 into which the concrete is to flow when the mold is being filled is thus accurately defined. The member 55 remains in position on a pallet even after the mold article is stripped from the mold, so as adequately to support the edge of the article against slumping.

The formation of cored apertures for the anchor pins is provided by the aid of several core rods 59. These rods 59, however, while they extend completely through the recess 52, extend only partly into the recess 53. In order to ensure that the rods 59 will be accurately positioned with relation to the recess 53, so that it will extend to the desired amount only, into the recess, provisions are made for restraining the rod 59 from axial movement unless it be desired to remove or insert the rod 59.

Thus the rod 59 may be provided with annular groove 61 adjacent the handle end 60. Into this groove a pivoted latch structure 62 is adapted to engage. It is urged to latching position by a weight. The details of this latching structure will be described in connection with the right hand mold 50, as well as Fig. 9.

Additional apertures are required to be formed in the plate molded in the space 49, which apertures are transverse to the space 54. For this purpose the bottom of the mold member 55 may be provided with a series of projections 63 contacting with a similar series of projections 64, shown as integral with the bottom plate 51. These two sets of projections 63 and 64 cooperate to provide transverse cores. As many sets of these projections 63 and 64 may be provided as are required.

The right hand mold space 50 is shown as having the pillar forming recesses 65, 66 and 67. The bottom mold plate 68 can be formed as an integral continuation of the mold plate 51. In order to secure the desired configuration of the plate to be cast in mold space 50, a removable mold member 69 may be provided. This mold member ensures that the draw of the mold will be proper. It is shown to best advantage in Figs. 7 and 8. It may have its end edges accommodated in grooves 70 formed on the inner surface of the hinged mold sides 56.

A core rod 71 is provided, to pass transversely through the recesses 66 and 67, and partly into the recess 65. As shown most clearly in Fig. 9, this core rod 71 is provided with an annular groove 72 which is adapted to be engaged by one arm 73 of a weighted lever 74. The weight 75 urges the arm 73 into locking position with respect to the annular groove 72. If it be desired to remove or replace the core rod 71, the lever arm 73 may be depressed so as to move it out of engagement with the annular groove 72.

So far as the supporting of the mold structure by the aid of a frame is concerned, this is entirely similar to that provided for the mold structure illustrated in Figs. 1 to 4 inclusive.

In the mold structure illustrated in Fig. 10, the plate to be cast in the mold space 78 is similar to that to be cast in the mold space 50 of Fig. 5, except that it is extended to form a longer plate section. Thus recesses 76 and 77 correspond to recesses 65 and 66 of Fig. 5; and the recess 79 corresponds to recess 67 of Fig. 5. A recess 80 is also provided, symmetrical with the recess 79. The end recess 81 is similar to the other end recesses to form the end pillar section of the plate.

In this case the core rod 82 can extend through all of the recesses 77, 79, 80 and 81 and partly into the recess 76. This core rod 82 may be held against axial displacement by mechanism similar to that illustrated in Fig. 9. The recesses 65 and 76 are intended to form the edge portions defining a corner of the wall.

In other respects the mold structure illustrated in Fig. 10 is similar to the mold structures heretofore described.

In the form of the mold structure illustrated in Fig. 11, two short plates are intended to be cast, instead of one long plate as in the form of Fig. 1. For this purpose there is a central integral partition 83 dividing the mold structure into the left hand mold space 84 and a right hand mold space 85. Since these mold spaces are symmetrical with respect to the partition 83 and since they are quite similar to that shown in Fig. 1, a detailed description is unnecessary. These mold spaces 84 and 85 simply omit the intermediate pillar section recesses and provide only the edge pillar section recesses, such as 86 and 87. Common core rods 88, however, may be used to pass through all of the recesses in both of the mold spaces.

What is claimed is:

1. A mold structure for forming a building slab having structural features including projecting ribs, formed on one face, comprising a unitary plate member forming the bottom and ends of the mold, and adapted to form substantially all of said structural features, and including downwardly extending recesses for forming said ribs, side members secured to said plate for defining the side edges of the slab, being a detachable mold member overhanging from one of the mold edges and having a lower molding surface defining with the plate a shallow molding space adjacent an edge of the mold, and means forming a shoulder on each of said side members for positioning and supporting said detachable mold member.

2. A mold structure for forming a building slab having structural features including projecting ribs, formed on one face, comprising a unitary plate member forming the bottom and ends of the mold, and adapted to form substantially all of said structural features, and including downwardly extending recesses for forming said ribs, side members being secured to said plate for defining the side edges of the slab, a detachable mold member overhanging from one of the mold edges and having a lower molding surface defining with the plate a shallow molding space adjacent an edge of the mold, said member extending across the mold, and transverse cores extending through said molding space, said cores serving to at least partly support said member.

3. A mold structure for forming a building slab having structural features including projecting ribs, formed on one face, the opposite face being plane, comprising a single mold plate adapted to form substantially all of said structural features including the end edges of the slab, side members detachably secured to said plate for defining the side edges of the slab, and means secured to the mold structure adapted to form one element of a pivotal support for said structure, whereby the structure may be inverted for stripping from the slab.

JOHANNES C. P. LEEMHUIS.